(12) United States Patent
Langseth et al.

(10) Patent No.: US 8,433,161 B2
(45) Date of Patent: Apr. 30, 2013

(54) ALL GLASS FIBER LASER CLADDING MODE STRIPPER

(75) Inventors: Jason E. Langseth, Malden, MA (US); Alexander E. Mandl, Brookline, MA (US)

(73) Assignee: Textron Systems Corporation, Wilmington, MA (US)

( * ) Notice: Subject to any disclaimer, the term of this patent is extended or adjusted under 35 U.S.C. 154(b) by 350 days.

(21) Appl. No.: 12/886,924

(22) Filed: Sep. 21, 2010

(65) Prior Publication Data

US 2012/0070115 A1  Mar. 22, 2012

(51) Int. Cl.
*G02B 6/26* (2006.01)
(52) U.S. Cl.
USPC ............ 385/29; 385/15; 385/27; 385/28; 385/31
(58) Field of Classification Search ............ 385/15, 385/27, 28, 29, 31
See application file for complete search history.

(56) References Cited

U.S. PATENT DOCUMENTS

| 4,575,181 A | 3/1986 | Ishikawa |
| 4,585,514 A | 4/1986 | Scallan |
| 5,363,463 A * | 11/1994 | Kleinerman ............ 385/123 |
| 5,867,305 A * | 2/1999 | Waarts et al. ............ 359/337.12 |
| 5,970,081 A | 10/1999 | Hirayama et al. |
| 6,164,280 A | 12/2000 | Everett et al. |
| 6,167,177 A | 12/2000 | Sandstrom et al. |
| 7,206,064 B2 * | 4/2007 | Rogers et al. ............ 356/28 |
| 7,470,124 B2 | 12/2008 | Bornstein |
| 7,492,987 B2 | 2/2009 | Yeik et al. |
| 2007/0172174 A1 | 7/2007 | Scerbak et al. |
| 2009/0175301 A1 | 7/2009 | Li et al. |

FOREIGN PATENT DOCUMENTS

WO   2007042845 A2   4/2007

OTHER PUBLICATIONS

Wetter et al., "High Power Cladding Light Strippers," Proc. of SPIE, vol. 6873, 2008, 8 pages.

* cited by examiner

*Primary Examiner* — Jennifer Doan
(74) *Attorney, Agent, or Firm* — BainwoodHuang (57) ABSTRACT

A system configured to generate an optical beam from a fiber laser is presented. The system includes a fiber gain medium having a core and a cladding, the core being configured to convert radiation from a pump beam into an output beam, the cladding having a mode propagating section and a mode stripping section bounded on a near end and a distal end by the mode propagating section, the mode stripping section of the cladding being configured to scatter excess pump radiation received from the mode propagating section in a substantially outwardly radial direction. The system also includes a rigid support member into which the fiber gain medium is placed, the rigid support member completely encompassing the mode stripping section of the cladding and joined to the fiber at the mode propagating section of the cladding.

15 Claims, 5 Drawing Sheets

ALL GLASS FIBER LASER CLADDING MODE STRIPPER

BACKGROUND

In fiber optics generally the term cladding mode stripper refers to any method whereby light propagating in the cladding (i.e. not the core in which waveguide modes are desired) is caused to propagate out of the cladding. The cladding mode stripper must absorb or redirect the stripped light. Most single-mode fiber for use in telecommunications applications includes a high index core, a slightly lower index cladding, and a high index polymer (substantially higher than the cladding index) coating on the outside for protection. The high index polymer also functions as a cladding mode stripper.

In high power fiber lasers (HPFLs), however, the cladding mode stripping becomes more difficult as it must perform at a substantially higher power level. Fluorescence and escaped core light from high-power splices will generally propagate in the cladding of a HPFL. In contrast to telecom fiber, a HPFL has a low index rather than high index coating (in order to propagate the low-brightness pump light). Such light will need to be stripped. Also, the output of any fiber laser is eventually a glass/air interface, leading to a 3.5% Fresnel reflection that will propagate backwards into the cladding and will also need to be stripped. In kilowatt-class systems this is a large amount of power, comparable in magnitude to unused pump power, which is the primary reason for the cladding mode stripper.

In HPFLs based on three-level gain media (e.g. Erbium, Ytterbium) the length of the gain fiber is typically restricted to absorbing only 95-97% of the pump light; if the fiber gets much longer then the end of the fiber will have very weakly pumped regions with appreciable ground state absorption.

Ground state absorption acts as a loss mechanism for the signal propagating through the end of the fiber. In oscillator configurations such loss leads to poor slope efficiency due to large cavity losses, and in Master Oscillator/Power Amplifier [MOPA] configurations this leads to poor efficiency due to the reabsorption of the signal and likely additional fluorescence from the excited state caused by this reabsorption. Furthermore, this weakly pumped absorbing region may act as a saturable absorber (an absorber which, given enough energy, will suddenly become transparent, because the ground state has been depleted). At low powers the weakly pumped region may be a mere loss mechanism, but at high powers very dangerous effects can happen due to this saturable absorber effect within the unpumped region.

In co-pumped MOPA configurations a weak signal is typically incident on the fiber at the same point as the full pump power (i.e. no pump has been absorbed yet). This leads to a large population inversion at the beginning of the gain fiber, and, due to the long upper state lifetime in Erbium and Ytterbium fibers, leads to good energy storage. Unfortunately, an energy storage medium at one end, with a saturable absorber at the other end, coupled with parasitic reflections that are present in almost any fiber-based system, defines the most general type of passively Q-switched laser. In high power CW MOPA systems passive Q-switching effects are undesired and can lead to pulse energies well beyond the damage threshold of glass, destroying the laser and its components. If dichroic filter protection is not used on the pump diodes, it can also destroy the very expensive pump diodes. It is therefore very important to avoid passive Q-switching in high power CW fiber MOPAs, and keeping the fiber short enough to avoid weakly pumped regions is part of this strategy, along with eliminating parasitic reflections as much as possible.

Unfortunately, keeping the fiber short implies that some pump power will not be used and will continue propagating beyond the end of the gain fiber. This pump power must be stripped to avoid degrading the beam quality of the output or possibly harming other components downstream from the gain fiber. In practice what makes this unused pump power management so difficult is that the pump absorption rate (dB/meter) can vary with pump current and hence pump power. This occurs, for example, in the case of pumping ytterbium-doped fiber at 976 nm, as the Ytterbium absorption peak at 976 nm is very sharp and narrow and small pump wavelength drifts with diode current can cause the absorption rate to change dramatically. Thus, if one designs a MOPA for 13 dB pump absorption at maximum pump current, on the way up to the maximum pump current the absorption rate might be slightly lower at intermediate pump currents, leading to greater than expected unused pump power. In kilowatt-class systems, unused pump light can reach into the hundreds of watts due to these effects.

SUMMARY

In the current approach, the generation of heat in and around the high-index polymer recoat material and in the low index coating on the fiber that is in thermal contact with the cladding mode stripper structure can create a serious problem. Even with aggressive heat sinking the internal temperature of the polymer materials on the fiber will rise, and these polymers structurally and optically degrade at around 90-100 C and catch fire at around 150 C. With cladding mode strippers made from standard epoxies and polymer coatings, it has been discovered that, using a black anodized aluminum heat sink material to absorb the stripped light, external temperatures reach nearly 90 C for around 60 W of dumped power.

It is clear from the above that passive Q-switching effects from the saturable absorber at the distal end of a long fiber gain medium can create destructive effects. To avoid these effects, it would seem that a short fiber would remedy this disadvantage. Nevertheless, if the fiber gain medium is too short, then substantial amounts of unused pump power propagate past the fiber gain medium and must be stripped. In contrast to the above, a technique of generating an optical beam from a fiber laser that suffers from neither of the above disadvantages is presented as an embodiment of a system. The system includes a fiber gain medium having a core and a cladding, the core being configured to convert radiation from a pump beam into an output beam, the cladding having a mode propagating section and a mode stripping section bounded on a near end and a distal end by the mode propagating section, the mode stripping section of the cladding being configured to scatter excess pump radiation received from the mode propagating section in a substantially outwardly radial direction. The system also includes a rigid support member into which the fiber gain medium is placed, the rigid support member completely encompassing the mode stripping section of the cladding and joined to the fiber at the mode propagating section of the cladding.

Implementations are directed to the following.

The system can further include a heat sink, thermally disconnected from the fiber gain medium, configured to absorb the scattered excess pump radiation.

The rigid support member can be an optically transparent capillary tube. In this case, the capillary tube can be joined to the mode propagating section of the fiber with a clear rubber sealant.

The scattered excess radiation can form a substantially Lambertian source. In this case, the outer surface of the mode stripping section of the cladding can include frosted glass.

The mode stripping section of the cladding can be between about 5 cm and about 10 cm in length.

The fiber gain medium can be a fiber laser. In this case, the core can be doped with a rare earth metal configured to perform the converting of the input optical beam to the output optical beam. For example, the rare earth metal can be Ytterbium. In this case, the wavelength of the pump beam is about 976 nm, and the wavelength of the output beam is between about 1030 nm and 1100 nm. When the output power is greater than about 1000 W, the power of the scattered radiation can be greater than about 90 W. In another example, the rare earth metal can be Erbium. In this case, the wavelength of the pump beam is about 1532 nm, which in turn was generated by a Er:Yb laser pumped at 976 nm, and the wavelength of the output beam is about 1550 nm. When the output power is greater than 1000 W, the power of the scattered radiation can be greater than about 90 W.

A further embodiment of the technique of generating an optical beam from a fiber laser is presented as an embodiment of a system. The system includes a fiber gain medium having a core and a cladding, the core configured to convert radiation from a pump beam into an output beam, the cladding having a mode propagating section and a mode stripping section bounded on a near end and a distal end by the first section, excess pump radiation propagating in the first section of the cladding, the mode stripping section of the cladding having a beam scattering section including a set of equiangular fins protruding from the cladding, each fin in the set of equiangular fins having a pair of linear walls apart from the outer surface of the cladding and being configured to (1) trap the excess pump radiation and (2) eject the trapped radiation outwardly through the pair of linear walls.

Implementations are directed to the following.

The system can further include a heat sink, thermally disconnected from the fiber gain medium, configured to absorb the scattered excess pump radiation.

The number of fins in the set of equiangular fins can be six. In this case, the angle between the pair of linear walls in each equiangular fin from the set of equiangular fins is 60 degrees and the trapped radiation is ejected within five reflections from the inner surfaces of the linear walls of each equiangular fin.

The fiber gain medium can be a fiber laser. In this case, the core can be doped with a rare earth metal configured to perform the converting of the input optical beam to the output optical beam. For example, the rare earth metal can be Ytterbium. In this case, the wavelength of the pump beam is about 976 nm, the wavelength of the output beam is between about 1030 nm and 1100 nm, and the power of the scattered radiation is greater than about 100 W. In another example, the rare earth metal can be Erbium. In this case, the wavelength of the pump beam is about 1532 nm, which in turn was generated by a Er:Yb laser pumped at 976 nm, and the wavelength of the output beam is about 1550 nm. When the output power is greater than 1000 W, the power of the scattered radiation can be greater than about 90 W.

A further embodiment of the technique of generating an optical beam from a fiber laser is presented as an embodiment of a method of manufacturing a fiber gain medium including a core and a cladding, the core configured to convert pump radiation into an output beam. The method includes protecting the fiber away from a selected section of the cladding. The method also includes applying a roughening treatment to the selected section of the cladding.

Implementations are directed to the following.

Applying a roughening treatment can include making a roughened surface on a piece of passive fiber which has a core and cladding identical to the fiber gain medium and splicing the roughened passive fiber onto the fiber gain medium.

Applying the roughening treatment can include applying a substance including ammonium and sodium bifluoride over the outer surface of the selected section of the cladding. In this case, applying the roughening treatment also includes leaving the substance on the outer surface of the selected section of the cladding for about 30 minutes and removing the substance to reveal a frosted glass texture on the outer surface of the selected section of the cladding.

Applying the roughening treatment can include placing a passive fiber into a cylindrical RF magnetron sputter apparatus. In this case, applying the roughening treatment also includes moving the roughened surface to a selected position within the RF magnetron sputter apparatus corresponding to a position in which the selected section of the cladding acts as a substrate within the RF magnetron sputter apparatus and enabling a sputter process within the RF magnetron sputter apparatus to the selected section of the cladding.

Applying the roughening treatment can include introducing randomly placed features in the cladding within the selected section of the cladding to affect a substantially Lambertian source of scattered radiation.

A further embodiment of the technique of generating an optical beam from a fiber laser is presented as an embodiment of a method of generating an optical beam from a fiber laser. The method includes illuminating the fiber laser, the fiber laser having a fiber including a core and a cladding, with an optical power source which includes an array of diode pump lasers, each diode pump laser having a wavelength of about 976 nm. The method also includes scattering out through a section of the cladding at least 20 dB of optical power from the cladding while maintaining a temperature increase less than 5 degrees Celcius. The method further includes generating an output optical beam having an optical power greater than about 5 kW, the output optical beam including a single mode and being diffraction-limited.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of generating an optical beam from a fiber laser increases the amount of excess pump radiation power scattered out of a fiber gain medium at a very small increase in temperature. Such a technique can eliminate much of the risk of catastrophic damage to the fiber due to both passive Q-switching effects from long fibers and residual unconverted pump radiation at a distal end of the fiber in short fibers.

Figure 1:
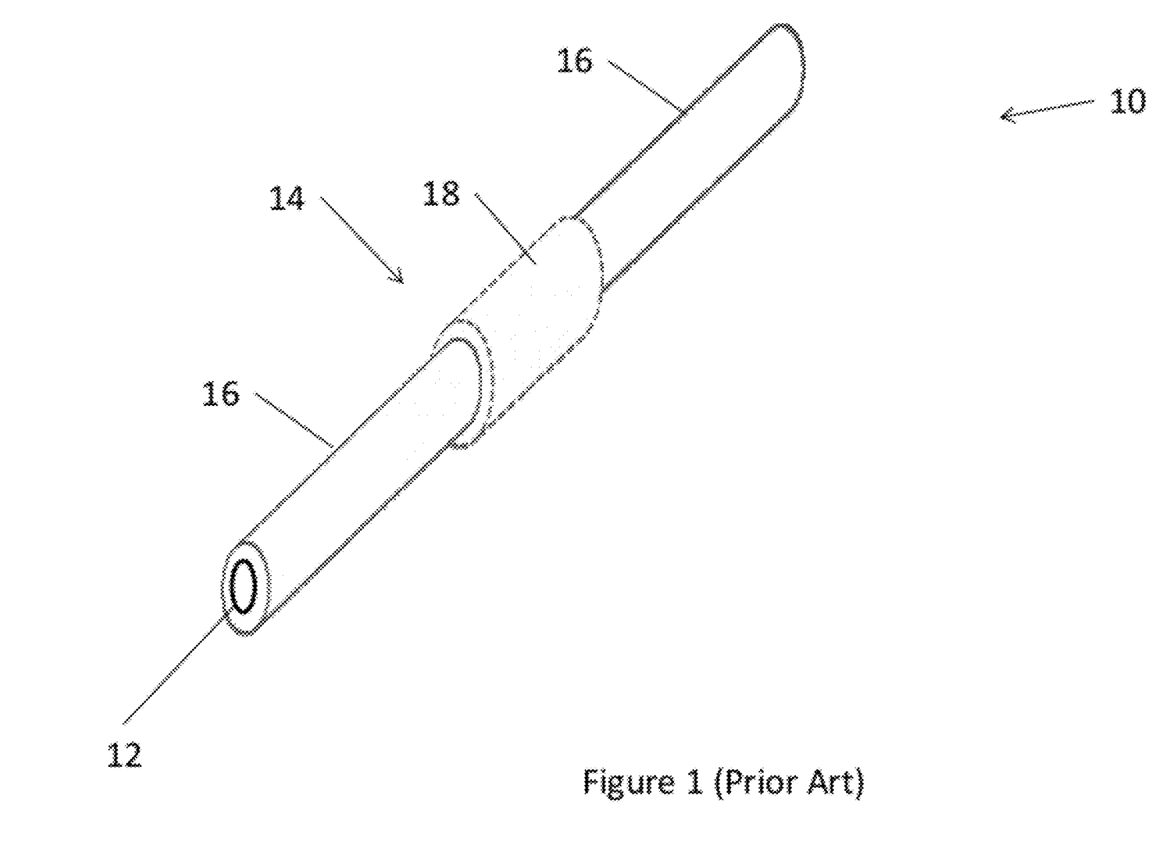
FIG. 1 is a schematic diagram of a cladding mode stripper using a high-index polymer.

FIG. 1 shows a part of a fiber gain medium 10 adapted to strip cladding mode power out of the fiber. Fiber gain medium 10 includes a silica fiber 12 and a cladding mode stripper 14 as used in some current configurations. Cladding mode stripper 14 includes a high-index coating 18 over a selected section of silica fiber 12. A low-index coating 16 resides over the rest of silica fiber 12.

Silica fiber 12 includes a core having an index of e.g., 1.449 and a cladding having an index just slightly smaller than that of the core [e.g., 1.448]. The core in a fiber used in a fiber gain medium (i.e., an active fiber) is typically doped with a rare earth metal, for example, Erbium or Ytterbium.

Cladding mode stripper 14 is generally made from a a high-index polymer. In the fiber gain medium 10, the low index-coated fiber propagates the pump light, except that, in the selected section, the low index coating 16 is stripped off and high index coating 18 is recoated onto the selected section. Alternatively, the recoating with high index coating 18 may be performed on a passive fiber with core and cladding optically matched to fiber gain medium 10, after which recoating the passive fiber is spliced onto fiber gain medium 10. Low-index coating 16 is, e.g., a fluoroacrylate coating having an index of refraction of about 1.373. High-index coating 18 is, e.g., an acrylate coating having an index of refraction of about 1.50.

The stripping of the low-index coating 16 and its replacement with the high-index coating 18 effectively spoils total internal reflection at the cladding/low index coating interface as this radiation propagates into the high index coating. Due to absorption and scattering in the high index coating, some of this radiation is turned into heat and is dissipated by a structure in which the cladding mode strippers reside; generally this structure is made from a thermally-conductive material such as aluminum. Some of the radiation propagates through the high-index coating and is either absorbed or reflected by the cladding mode stripper itself depending on its optical properties. On the other hand, the high index coating can become a larger waveguide (guiding at the coating/air interface), and can redirect some of the stripped but unabsorbed radiation back into the receiving low index coated fiber on the other side.

The main problem with this approach, however, is the generation of heat in and around the high-index coating 18 and in the low index coating 16 on the fiber that is likely in thermal contact with the cladding mode stripper. Even with aggressive heat sinking the internal temperature of the polymer materials on the fiber will rise, and these polymers structurally and optically degrade around 90-100 C, catching fire at around 150 C.

The failure of the high-index polymer stripper gave rise to the idea of optically transparent cladding mode stripping structures. Such a structure could take the form of an all glass structure that scatters the light out of the fiber without the use of materials like polymers that can absorb light and heat. The scattered light is absorbed in a surrounding enclosure which can be cooled; thus, the heat is dissipated in a structure thermally disconnected from the fiber. This results in a substantial reduction in heating of the fiber itself and allows operation at very high power levels. The generalized approach is to add structure to the glass cladding of the fiber which will interrupt total internal reflection in the glass cladding and scatter away the unwanted pump light.

Figure 2:
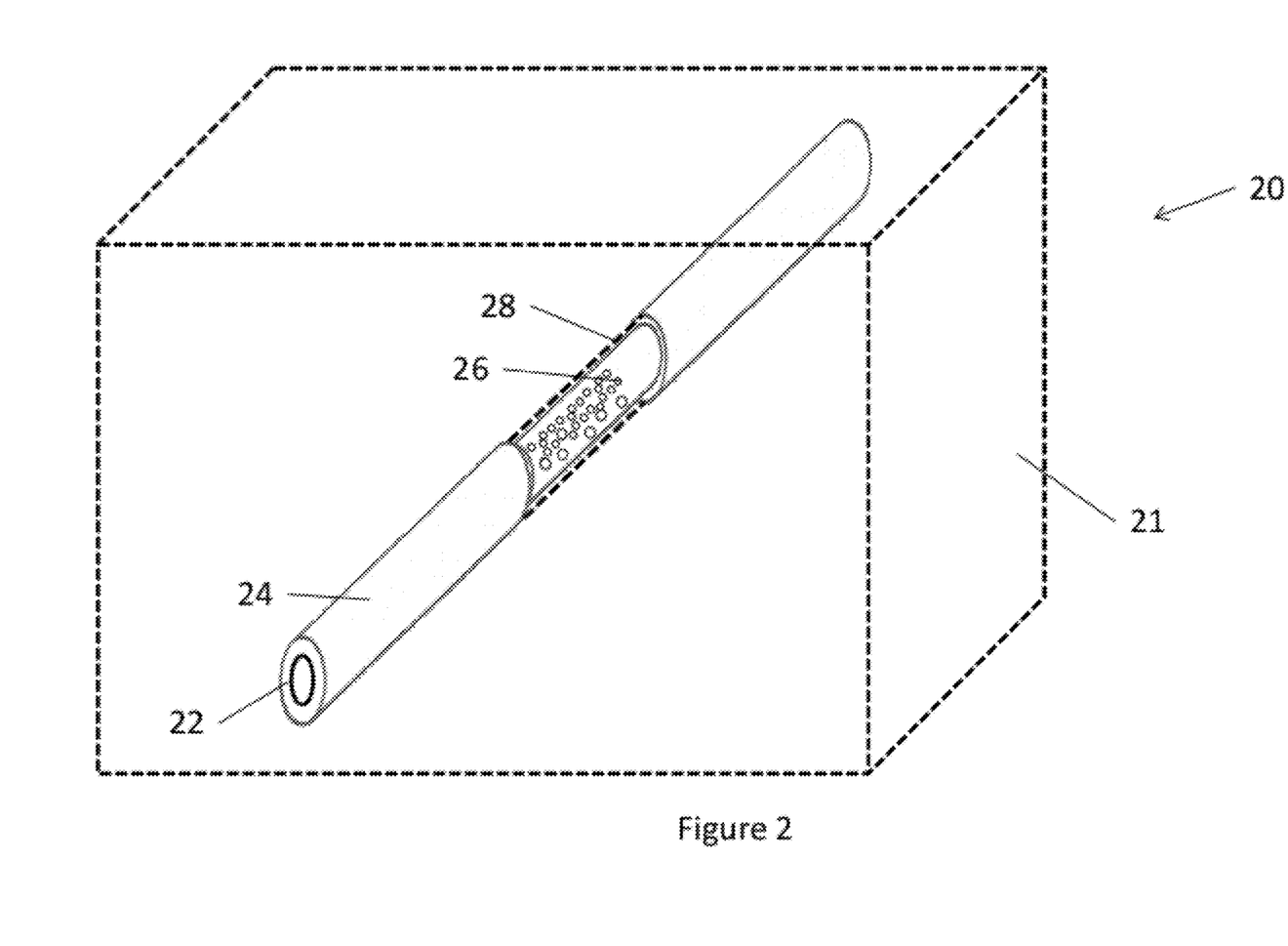
FIG. 2 is a schematic diagram of an all-glass cladding mode stripper with a rough glass section.

FIG. 2 illustrates an all-glass cladding mode stripper 20. All-glass cladding mode stripper 20 includes a silica fiber 22, low-index coating 24, mode stripping section 26, and rigid support member 28. Surrounding fiber 22 is a water-cooled thermal enclosure 21. The fiber 22 and low-index coating 24 can be as described in the structure described in FIG. 1 above.

Mode stripping section 26 includes a selected section of fiber 22, except that the outer surface of the cladding has been roughened. The diameter of the mode stripping section 26 before roughening can be the same as that of fiber 22. The roughening of the outer surface of the cladding can be such that mode stripping section 26 takes the form of frosted glass. Other forms for the roughened surface include ground glass or sputter-etched divots.

Roughening the surface of mode stripping section 26 can result in the surface becoming brittle and more prone to breakage. The rigid support member fits over mode stripping section 26 and provides protection against breakage. Such a support member should be transparent and resistant to thermal effects.

In keeping with the above description, rigid support member 28 is, e.g., a fused silica capillary tube. Rigid support member 28 is fit over mode stripping section 26 and is attached to portions of the low-index coating 24 on either side of mode stripping section 26.

Mode stripping section 26 circumvents the problems associated with polymer heating by avoiding the dissipation of light in polymers alone or in structures which can couple heat back to polymers. By stripping the low-index coated fibers and creating a frosted scattering surface on the cladding, the cladding light is scattered away into free space where it can be absorbed by a structure that is thermally disconnected from the fiber.

The frosting of the cladding can be accomplished by applying a compound of ammonium/sodium bifluorides sold as "Armour Etch" by Armour Products of Hawthorne, N.J. and commercially available in craft stores. This known glass etchant creates a frosted surface and is used by hobbyists for creating frosted glass patterns. By applying Armour Etch over an about 8 to an about 10 cm region and allowing the etchant to act for 30 minutes (or until compound appears dry), stripping ratios of between 23 and 30 dB were obtained (for comparison, the polymer recoat-based strippers achieved ratios of 15-16 dB). 110 W of power was dissipated with an observed temperature rise on the hottest part of the glass of only 4.5 deg C., a ratio of 0.04 deg C. per W. This heating is an order of magnitude less heating than commercially available cladding mode strippers specifically designed for HPFL applications and the temperature rise is much smaller than temperature rises observed on other cladding mode strippers.

During operation, radiation propagates through the cladding of fiber 22. Upon entering mode stripping section 26, this radiation is scattered outwardly and radially from the surface of fiber 22. The radiation in mode stripping section 26 typically forms a Lambertian source, so that the outward radiation profile is uniform in polar angle with respect to the outward surface normal of fiber 22. The scattered light is dissipated in a water-cooled thermal enclosure 21, which is absorbent at the pump wavelength. The fiber is held in place by Teflon spacers on the end of thermal enclosure 21, thermally disconnecting the fiber from the heat generated by the scattered light.

As mentioned previously, a rigid support member 28 such as a transparent fused silica capillary tube surrounds mode stripping section 26. Rigid support member 28 is joined to the low-index coating 24 with a clear rubber sealant. The sealant is preferably applied to rigid support member 28 at points far enough away from mode stripping section 26 so that the sealant does not interact with the light exposed at the end-points of mode stripping section 26.

Besides providing a rigid support for the brittle mode stripping section 26, rigid support member 28, joined to fiber 22 as detailed above, also keeps mode stripping section 26 clean. Cleanliness of mode stripping section 26 is necessary to avoid burning of particulates which might accumulate on the fiber should it be exposed to the outside environment for too long.

In this way, high powers can be safely generated from a fiber gain medium. For example, if the fiber gain medium is part of a fiber laser and has been doped with Ytterbium, output powers greater than 5 kW at a wavelength between about 1030 nm and about 1100 nm can be achieved. Alternatively, if the fiber in the fiber laser has been doped with Erbium, output powers greater than 5 kW at a wavelength of about 1550 nm can be achieved.

It should also be noted that the frosted scattering surface can be used in sections where it is desired to monitor the cladding light. By controlling the length of the mode stripping section 26 and the etchant acting time, different magnitudes of scattering can be achieved. If it is desired to monitor cladding light in a small section, a more modest amount of scattering can be designed and a photo detector or multimode fiber to collect the light can be placed nearby so that the light monitored externally.

Other configurations are possible in the space of all-glass claddings. For example, rather than a small-scale fixture that leads to diffuse or Lambertian scatter from fiber 22, larger-scale features over mode stripping section 26 can use geometric optical effects such as total internal reflection to strip cladding modes from fiber 22.

Figure 3:
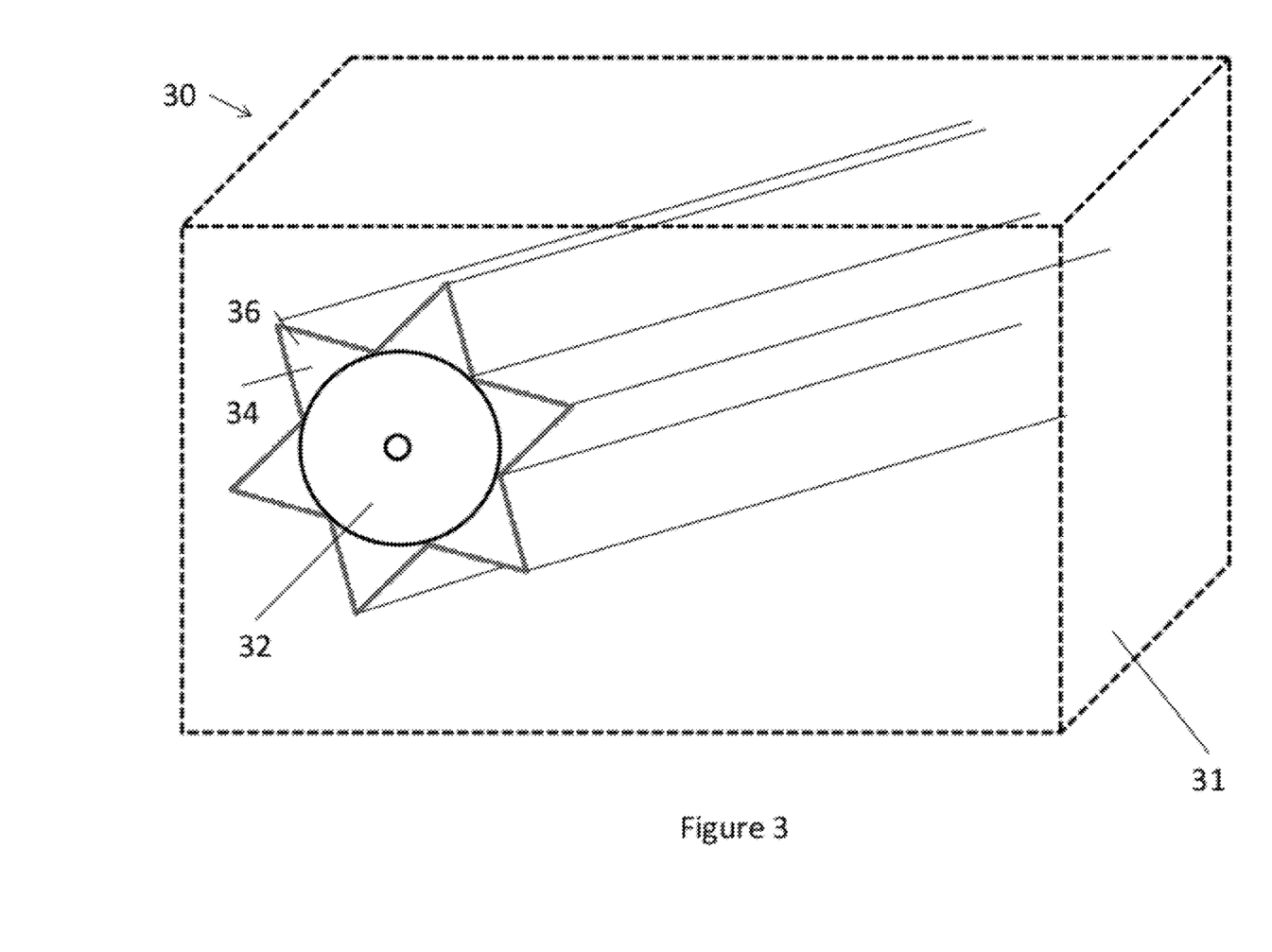
FIG. 3 is a schematic diagram of an all-glass cladding mode stripper with equiangular fins.

FIG. 3 illustrates a large-scale scattering structure 30 configured to strip cladding modes from fiber 22. Scattering structure 30 includes a silica fiber 32 and large-scale scattering structures 34. Surrounding fiber 22 is a watercooled thermal enclosure 31. The fiber 32 and low-index coating [not shown] can be as described in the previous example described above.

Large-scale scattering structures 34 as pictured in FIG. 3 include a set of equiangular fins protruding from fiber 32. For example, a set of six congruent structures 34 protruding from fiber 32 would have an angle 36 equal to 60 degrees. The equiangular fins are made from a glass material with a greater index of refraction than that of the cladding in fiber 32.

Such scattering structures 34 could be made through a subtractive etch process, such as grinding a fiber preform in an appropriate star shape and then pulling the preform into fiber, although additive processes such as CVD are possible. The length of structures 34 are about about 10 cm. Note that, unlike the frosted glass example detailed above, a rigid support structure may not be necessary.

During operation, propagating cladding modes enter large-scale scattering structures through refraction. Because structures 34 have a higher index of refraction than the cladding, radiation from the propagating cladding modes becomes trapped within the equiangular fins. The radiation either bounces off the walls of an equiangular fin or escapes through the wall through refraction. Generally, most, if not all, of the radiation entering an equiangular fin will exit the fiber within three bounces.

Methods of manufacture and use of the fibers including the mode stripping sections described above are described below with respect to FIGS. 4 and 5.

Figure 4:
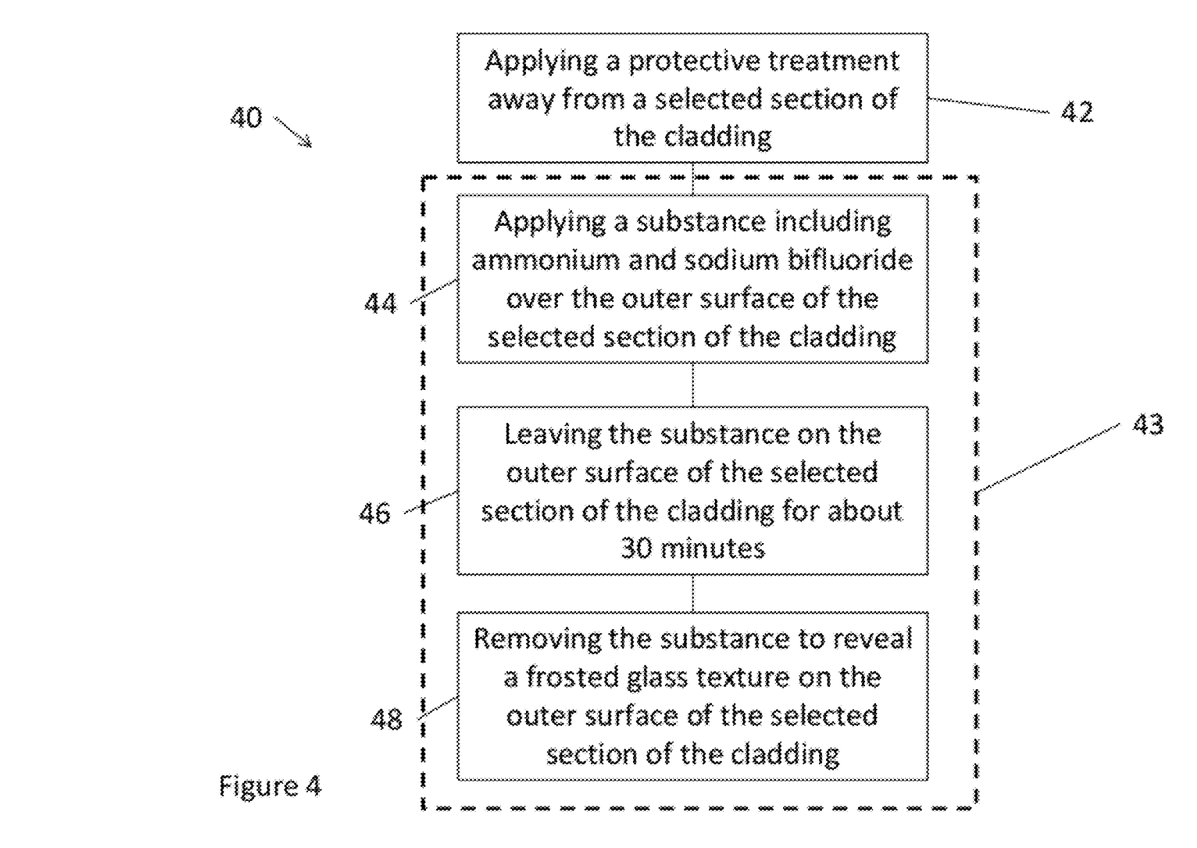
FIG. 4 is a flow chart of a method of manufacture of an all-glass cladding mode stripper.

FIG. 4 illustrates a method 40 of manufacturing a fiber gain medium including a core and a cladding, the core configured to convert pump radiation into an output beam. In step 42, a protective treatment is applied away from a selected section of the cladding. In step 43, a roughening treatment is applied to the selected section of the cladding.

Step 43 includes, as a particular case, steps 44, 46, and 48 which describe the specific case of creating a frosted glass surface on the selected section of the cladding. In step 44, a substance including ammonium and sodium bifluoride is applied over the outer surface of the selected section of the cladding. In step 46, the substance is left on the outer surface of the selected section of the cladding for about 30 minutes. In step 48, the substance is removed to reveal a frosted glass texture on the outer surface of the selected section of the cladding.

The application of a protective treatment as described in step 42 may be necessary to define and control the length of the mode stripping section. Such a protective treatment may simply take the form of the low-index coating on the cladding of the fiber. Alternatively, the protective treatment can be achieved with a standard etch resist such as photoresist used in standard semiconductor lithography processes. Such photoresist is manufactured and sold by, e.g., Rohm and Hass, Inc., of Marlborough Mass.

The substance described in step 44 may be, as described above, a product commonly used by hobbyists to produce frosted glass and is sold under the tradename "Armour Etch" by Armour Products of Hawthorne, N.J. and commercially available in craft stores.

As described above, the time that the substance is left on the cladding surface specified in step 46 can be varied according to desired use of the mode stripping section. By controlling the length of the mode stripping section 26 and the etchant acting time, different magnitudes of scattering can be achieved. The 30 minutes prescribed in step 46 allows for the scattering of amounts of radiation consistent with those found in HPFL applications.

Alternatively, the roughening in step 43 can be achieved by making a roughened surface on a piece of passive fiber which has a core and cladding identical to the fiber gain medium and splicing the roughened passive fiber onto the fiber gain medium.

Alternatively, the roughening in step 43 can be achieved through an RF magnetron sputtering process. Such a process includes placing a passive fiber as specified above into a cylindrical RF magnetron sputter apparatus, moving the passive fiber to a selected position within the RF magnetron sputter apparatus corresponding to a position in which the selected section of the cladding acts as a substrate within the RF magnetron sputter apparatus, and enabling a sputter process within the RF magnetron sputter apparatus to the selected section of the cladding.

Figure 5:
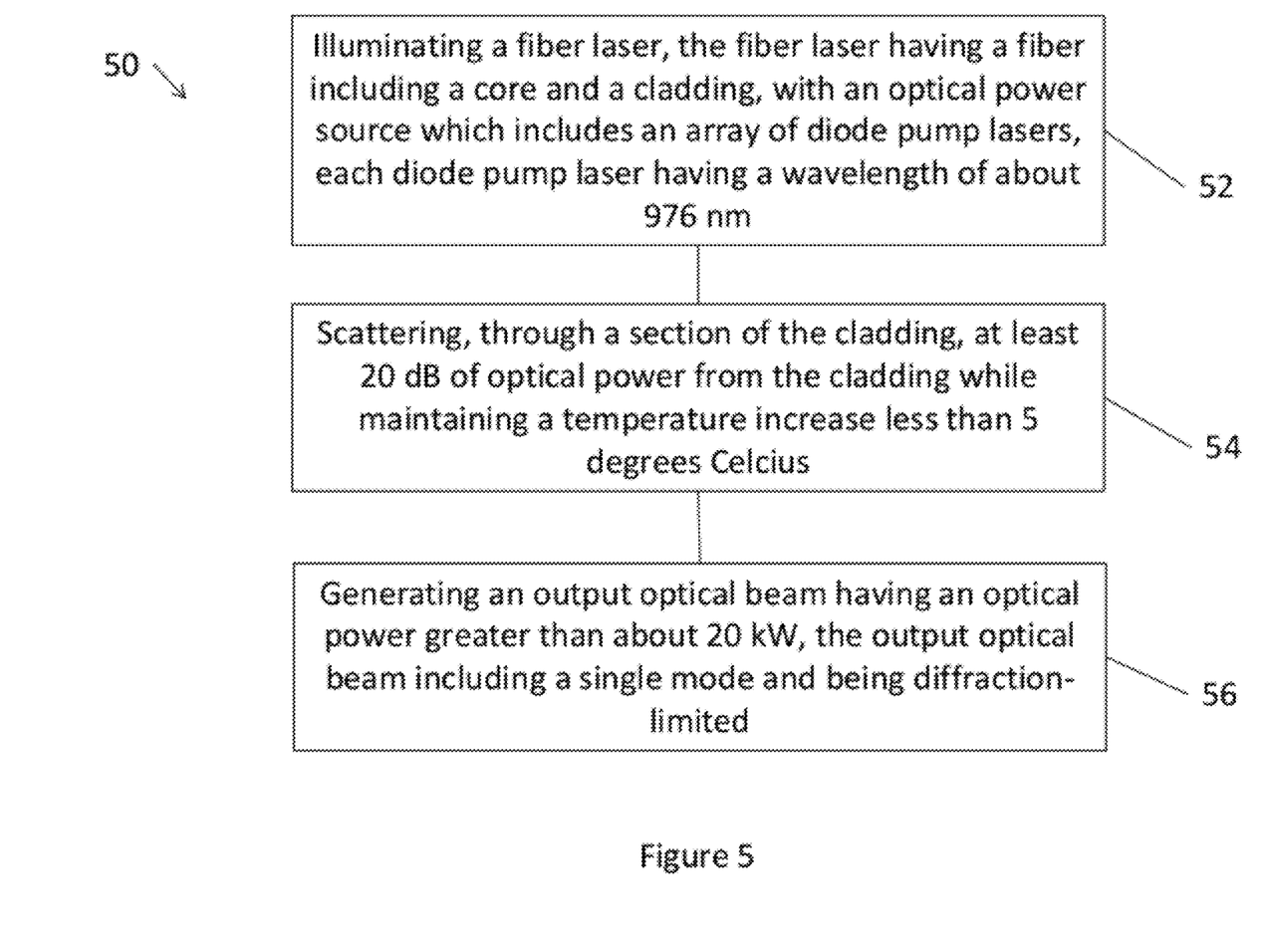
FIG. 5 is a flow chart of a method of generating an optical beam from a fiber laser.

FIG. 5 illustrates a method 50 of generating an optical beam from a fiber laser. In step 52, a fiber laser is illuminated, the fiber laser having a fiber including a core and a cladding, with an optical power source which includes an array of diode pump lasers, each diode pump laser having a wavelength of about 976 nm. In step 54 at least 20 dB of unused pump power is scattered out from the cladding while maintaining a temperature increase less than 5 degrees Celcius through a section of the cladding. In step 56, an output optical beam having an optical power greater than about 5 kW is generated, the output optical beam including a single mode and being diffraction-limited.

The radiating out of power from the cladding specified in step 54 can be accomplished as follows. By applying Armour Etch over an about 8 to an about 10 cm region and allowing the etchant to act for 30 minutes (or until compound appears dry), stripping ratios of between 23 and 30 dB were obtained (for comparison, the polymer recoat-based strippers achieved ratios of 15-16 dB). 110 W of power was observed to be dissipated with an observed temperature rise on the hottest part of the glass of only 4.5 deg C., a ratio of 0.04 deg C. per W. This is an order of magnitude less heating than commercially available cladding mode strippers specifically designed for HPFL applications and similarly smaller than observed temperature rises observed on other cladding mode strippers.

While various embodiments of the invention have been particularly shown and described, it will be understood by those skilled in the art that various changes in form and details may be made therein without departing from the spirit and scope of the invention as defined by the appended claims.

What is claimed is:

1. A system comprising:
a fiber gain medium having a core and a cladding, the core being configured to convert radiation from a pump beam into an output beam, the cladding having a mode propagating section and a mode stripping section bounded on a near end and a distal end by the mode propagating section, the mode stripping section of the cladding being configured to scatter excess pump radiation received from the mode propagating section in a substantially outwardly radial direction; and
a rigid support member into which the fiber gain medium is placed, the rigid support member completely encompassing the mode stripping section of the cladding and joined to the fiber at the mode propagating section of the cladding.

2. A system as in claim 1, further comprising a heat sink, thermally disconnected from the fiber gain medium, configured to absorb the scattered excess pump radiation.

3. A system as in claim 1, wherein the rigid support member is an optically transparent capillary tube; and
wherein the capillary tube is joined to the mode propagating section of the fiber with a clear rubber sealant.

4. A system as in claim 1, wherein the scattered excess radiation forms a substantially Lambertian source.

5. A system as in claim 4, wherein the outer surface of the mode stripping section of the cladding comprises frosted glass.

6. A system as in claim 1, wherein the mode stripping section of the cladding is between about 5 cm and about 10 cm in length.

7. A system as in claim 1, wherein the fiber gain medium is a fiber laser; and
wherein the core is doped with a rare earth metal configured to perform the converting of the input optical beam to the output optical beam.

8. A system as in claim 7, wherein the rare earth metal is Ytterbium;
wherein the wavelength of the pump beam is about 976 nm;
wherein the wavelength of the output beam is between about 1030 nm and about 1100 nm; and
wherein the power of the scattered radiation is greater than 90 W.

9. A system as in claim 7, wherein the rare earth metal is Erbium;
wherein the wavelength of the pump beam is about 1532 nm;
wherein the wavelength of the output beam is about 1550 nm; and
wherein the power of the scattered radiation is greater than 90 W.

10. A system comprising:
a fiber gain medium having a core and a cladding, the core configured to convert radiation from a pump beam into an output beam, the cladding having a first section and a second section bounded on a near end and a distal end by the first section, excess pump radiation propagating in the first section of the cladding, the second section of the cladding having a beam scattering section including a set of equiangular fins protruding from the cladding, each fin in the set of equiangular fins having a pair of linear walls apart from the outer surface of the cladding and being configured to (1) trap the unconverted radiation and (2) eject the trapped radiation outwardly through the pair of linear walls.

11. A system as in claim 10, wherein the number of fins in the set of equiangular fins is six;
wherein the angle between the pair of linear walls in each equiangular fin from the set of equiangular fins is 60 degrees; and
wherein the trapped radiation is ejected within three reflections from the inner surfaces of the linear walls of each equiangular fin.

12. A system as in claim 11, wherein the fiber gain medium is a fiber laser; and
wherein the core is doped with a rare earth metal, the rare earth metal configured to perform the converting of the input optical beam to the output optical beam.

13. A system as in claim 12, wherein the rare earth metal is Ytterbium;
wherein the wavelength of the pump beam of is about 976 nm;
wherein the wavelength of the output beam is between about 1030 nm and about 1100 nm; and
wherein the power of the scattered radiation is greater than 90 W.

14. A system as in claim 12, wherein the rare earth metal is Erbium;
wherein the wavelength of the pump beam is about 1532 nm;
wherein the wavelength of the output beam is about 1550 nm; and
wherein the power of the scattered radiation is greater than 90 W.

15. A system as in claim 10, further comprising a heat sink, thermally disconnected from the fiber gain medium, configured to absorb the scattered excess radiation.

* * * * *